United States Patent [19]
Arnaud et al.

[11] 3,919,843
[45] Nov. 18, 1975

[54] MULTIFUNCTION CONTROL VALVE

[75] Inventors: Henri Arnaud, Cerny; Jean René Hergovalc'h, Bougival, both of France

[73] Assignee: Régie Nationale des Usines Renault, Paris, France

[22] Filed: Sept. 11, 1973

[21] Appl. No.: 396,332

[30] Foreign Application Priority Data
Dec. 12, 1972 France .............................. 72.44150
Apr. 6, 1973 France .............................. 73.12515

[52] U.S. Cl. .................................... 60/290; 60/289
[51] Int. Cl.² ....................... F01N 3/10; F02B 75/10
[58] Field of Search ......... 60/290, 289, 307; 91/437

[56] References Cited
UNITED STATES PATENTS

| | | | |
|---|---|---|---|
| 3,106,820 | 10/1963 | Schaffer | 60/290 |
| 3,220,179 | 11/1965 | Bloomfield | 60/290 |
| 3,245,726 | 4/1966 | Stelzer | 91/437 |
| 3,430,437 | 3/1969 | Saussele | 60/290 |
| 3,479,816 | 11/1969 | Masters | 60/290 |
| 3,520,320 | 7/1970 | Crawford | 60/290 |
| 3,611,715 | 10/1971 | Tatsutomi | 60/290 |
| 3,648,455 | 3/1972 | Muroki | 60/290 |
| 3,732,696 | 5/1973 | Masaki | 60/286 |
| 3,789,735 | 2/1974 | Tam | 60/307 |
| 3,805,522 | 4/1974 | Sheppard | 60/290 |
| 3,818,880 | 6/1974 | Dawson | 123/119 A |

*Primary Examiner*—Douglas Hart
*Attorney, Agent, or Firm*—Oblon, Fisher, Spivak, McClelland & Maier

[57] ABSTRACT

A multifunction control valve used to regulate the supply of additional air for post-combustion in the exhaust of internal combustion engines with anti-pollution means.

A pneumatic delay capacitance is subjected to the intake manifold vacuum through a solenoid valve closed by the starter switch, connecting the capacitance to atmosphere during starting. Under normal running conditions, the valve spring closing the shunt path to atmosphere produces a sensitive balance with the spring of the diaphragm of the vacuum chamber controlling the shunt.

In a second embodiment of the present invention, a vacuum chamber is subjected to intake manifold vacuum through a vacuum tank and a solenoid valve. The vacuum tank, provided with a check valve at the outlet leading to the intake manifold, is intended to maintain the vacuum chamber at low pressure when the intake vacuum becomes insufficient. The solenoid valve connects the vacuum chamber to atmosphere when it closes by the action of either a thermostatic switch on the cylinder head when the motor temperature is less than the opening temperature of the thermostat, or of a temperature sensor in the catalytic reactor when the temperature inside this reactor is above the sensor threshold temperature.

3 Claims, 2 Drawing Figures

MULTIFUNCTION CONTROL VALVE

BACKGROUND OF THE INVENTION

1. Field of the Invention

This invention relates to a multifunction control valve used for regulating the supply of additional air for post-combustion in the exhaust of internal combustion engines with anti-pollution means.

2. Description of the Prior Art

In known devices of this type, an air pump driven directly by the engine supplies air through a valve, called a diverter valve, either entirely to the exhaust manifold at the exhaust port of each cylinder, or, in the case of high speed, when the pump furnishes too much air, discharging this excess air by way of a discharge valve through a muffler.

During changes in speed, particularly slowing down, the supply of additional air is briefly interrupted to avoid backfiring. This momentary interruption is also effected by the diverter valve, the closing of which is controlled by a capsule and diaphragm moved by the variation of intake vacuum, with a buffer capacitance on the other side of the diaphragm which equalizes the pressure on the two sides of the diaphragm after a given time and reestablishes upon its return to its neutral position, the supply of air to the exhaust. If such valves prove effective in diverting excess air during rapid changes in speed, for a given fixed time, generally rather short, corresponding to sudden increases in intake manifold vacuum, as well as for the diversion and exhausting of high pressure air, they do not allow for interruption of the air supply for longer periods, as for example, during cold starting with closed choke when a supplementary so-called air interruption valve is necessary to cut-off the supply of post-combustion air to the exhaust at this time, when because of the high temperatures produced by the combustion of the enriched mixture, the air supply would be harmful.

SUMMARY OF THE INVENTION

It is accordingly, an object of the present invention to provide a diverter valve of simple and economic construction capable of performing all of the control functions for post-combustion air supply under all engine running conditions.

Another object of the present invention is to provide a diverter valve of simple and economic construction capable of performing all of the control functions for post-combustion air supply: for starting, when the air supply is discharged to atmosphere; for normal running, when the air is directed to the exhaust manifold; for changes in speed, when the air is momentarily blocked with an improved sensitivity of response and again shunted to atmosphere; and for high speeds, when the excess air is discharged by a relief valve.

Briefly, in accordance with one embodiment of the present invention, these and other objects are attained by providing a multifunction control valve for regulating the supply of post-combustion air in internal combustion engines including an inlet connected to an air pump, an outlet supplying air to the exhaust manifold and a diverter outlet to atmosphere through a muffler, a chamber with a diaphragm deflected by intake manifold vacuum controlling the closure by a valve of one or the other of these outlets, characterized by the fact that the delay capacitance is subjected to the vacuum of the intake by way of a solenoid valve which closes during starting when it connects capacitance to atmosphere.

In accordance with a second embodiment of the present invention there is provided a multifunction control valve for regulating the supply of post-combustion air in internal combustion engines including an inlet connected to an air pump, an outlet leading to the exhaust manifold and a shunting outlet to atmosphere through a muffler, and a vacuum chamber with a diaphragm actuated by intake vacuum to close one or the other of these outlets, the vacuum chamber being subjected to the intake vacuum by way of a vacuum tank, and a solenoid valve connecting the vacuum chamber to atmosphere when it is energized.

DESCRIPTION OF THE PREFERRED EMBODIMENT

Figure 1:
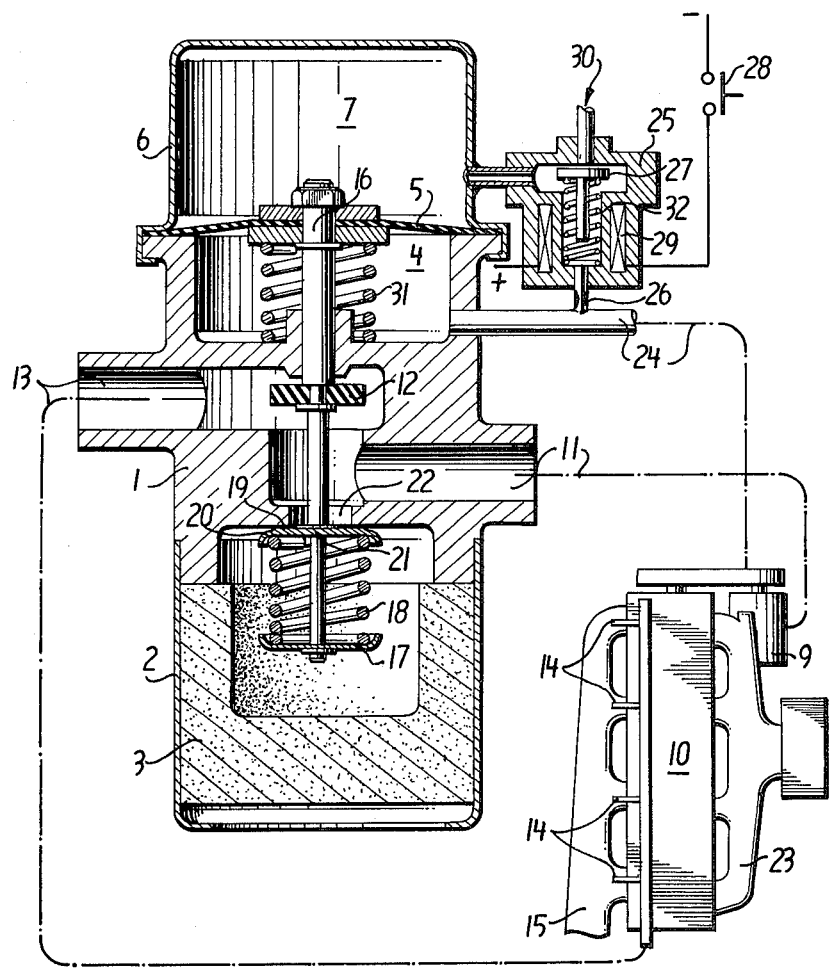
FIG. 1 is a cross-section of a valve in accordance with the present invention together with its connections, shown schematically as broken lines, with an air pump and the intake and exhaust manifolds of a motor, shown in reduced scale.

Referring now to the drawings wherein like reference characters designate identical or corresponding parts throughout the several views, and more particularly to FIG. 1 there is shown a valve including a body 1 closed at one end by a perforated cover 2 containing a muffler 3 and at the other end by a vacuum chamber 4 acting on a diagragm 5 and on which is fastened a cover 6 forming, behind the diaphragm, a pneumatic delay capacitance 7.

The air supplied by an air pump 9, driven by the motor 10, goes through passage 11, traverses the valve body 1 and is directed by the opening of valve 12 and output line 13 to the air injectors 14 in the mounting brackets of the exhaust manifold 15.

Diaphragm 5 drives the valve rod 16 to which valve 12 is rigidly attached and at the end of which is a cup 17 supporting a spring 18. Spring 18 presses cup 19, sliding on the end section of rod 16, either against the seat of the relief valve 20, or against a shoulder 21 on rod 16, when the latter, driven down by the diaphragm 5 opens the relief valve.

The vacuum chamber 4 is connected to the intake manifold 23 by a passage 24, itself connected to the buffer-capacitance 7 through a solenoid valve 25 and a constriction 26.

Valve 27 of this solenoid valve 25, when closure of the starter switch 28 energizes coil 29, closes the path between tube 24 and capacitance 7, connecting the latter at the same time to atmosphere by opening orifice 30.

In operation, during cold starting, closure of starter switch 28 thus causes capacitance 7 to be instantaneously set to atmospheric pressure which, against the vacuum in chamber 4, drives down diagharm 5, compreses spring 31, closes valve 12 and opens the relief orifice 22 through the muffler 3.

Opening the starter switch 28 deactivates the coil 29 and valve 27, driven by spring 32, closes orifice 30 and sets the capacitance 7 to the intake pressure by way of the constriction 26 and path 24. After the delay time due to the constrictor 26, the pressure in capacitance 7 and chamber 4 become equal, spring 31 returns diaphragm 5 which opens valve 12 and closes relief orifice 22. Cup 19 closing this orifice compresses spring 18. Under these conditions, the spring 31 pushes valve 12 lightly against its upper limit, and is almost in equilibrium with the compression of spring 18.

Valve 1 is then in its position for normal running, transmitting the air supplied by pump 9 to the air injectors 14 in the exhaust.

With every increase in intake vacuum, during speed changes, there results an almost instantaneous closure of valve 12 and a shunting of post-combustion air to atmosphere by the simultaneous opening of orifice 22.

At high speed, when pump 9 supplies too much air, the constriction due to valve 12 limits the supply and the high pressure produced in passage 11 pushes down cup 19 against spring 18, forming a valve for discharging the excess air to atmosphere through orifice 22 and muffler 3.

Thus, the valve of the invention operates under all engine conditions and simplifies the arrangement for post combustion air supply, having in particular the economy of an independent valve activated by the starter switch, that formed by the cup 19 and its spring 18 which is conveniently located inside the muffler 3 and at the same time balances the spring 31 of diaphragm 5 to increase the sensitivity of response.

Solenoid valve 25 permits the shunting of the post-combustion air supply to atmosphere with minimum means and power consumption, in contrast to a system which directly blocks the supply of air from pump 9 or directly operates valve 1.

Figure 2:
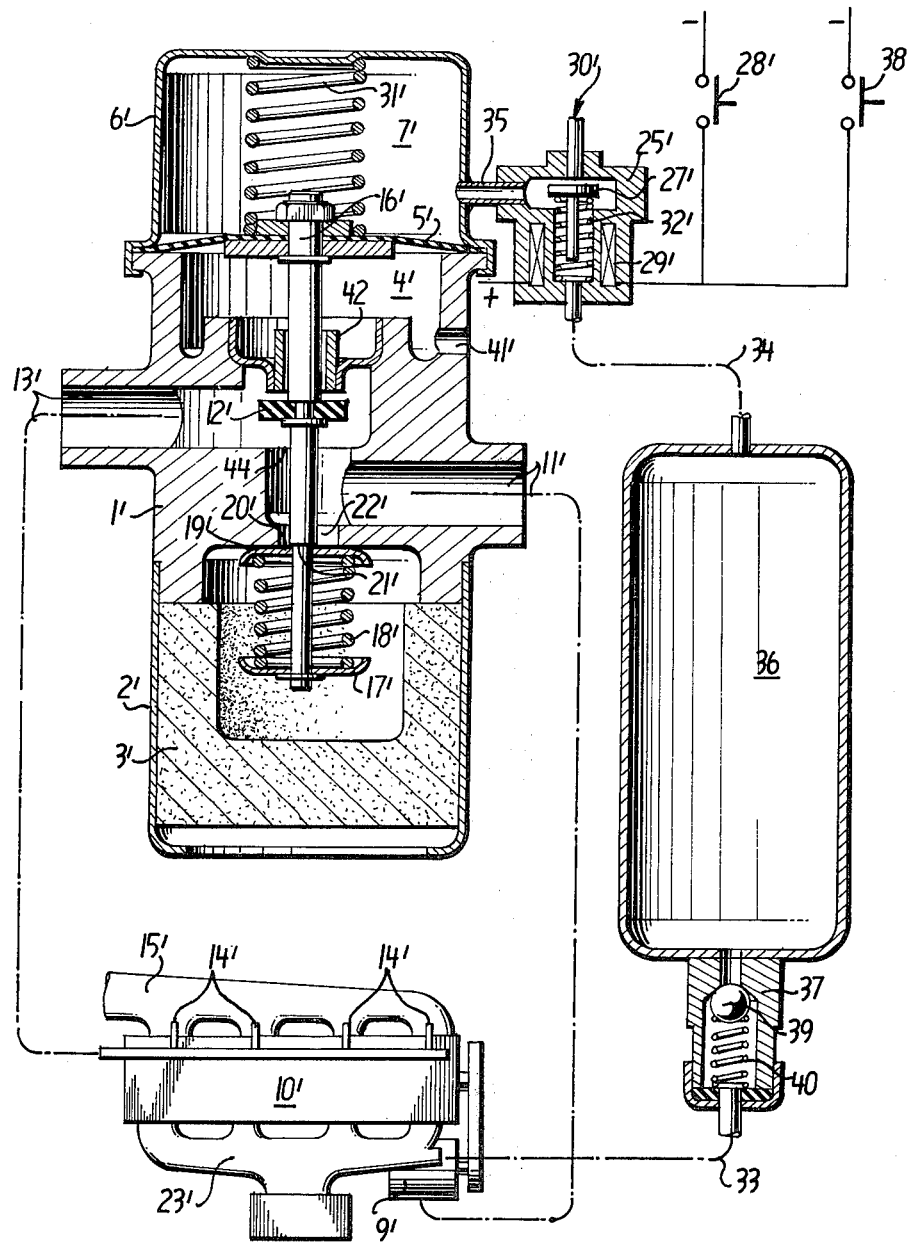
FIG. 2 is a cross-section of a valve in accordance with a second embodiment of the present invention together with its connections, shown schematically as broken lines, with an air pump and the intake and exhaust manifolds of a motor, and in addition, a vacuum tank, shown in reduced scale.

In the second embodiment of the present invention, as shown in FIG. 2, a vacuum tank is interposed between the intake manifold and the vacuum chamber of the shunting valve 1. This tank has in its outlet on the intake manifold side a check valve mounted and adjusted so that it blocks the outlet when the intake vacuum is less than a set level, of the order of 300 mbar, for example during operation at full load. The tank thus acquires a vacuum practically as soon as the motor starts, so that the diaphragm of the shunting valve is constantly subjected to this vacuum, either by the intake manifold or by the tank, thus assuring passage of post-combustion air to the exhaust manifold whatever the motor speed.

When the temperture reaches and exceeds a critical valve, for example, 700°C in the catalyst container and can lead to the destruction of the catalyzer, a temperature sensor located in it energizes a solenoid valve which connects the vacuum chamber of the shunting valve to atmosphere. This pressure then pushes the diaphragm down, resulting in the shunting of the post-combustion air to atmosphere. As soon as the temperature in the catalyst container returns to a value below 700°C the solenoid valve is deactivated and the diaphragm of the shunting valve is again subjected to the intake vacuum permitting the supply of post-combustion air to the exhaust to resume.

Also, in place of the choke switch of the first embodiment, there is connected in the excitation circuit of the solenoid valve, in parallel with the temperature sensor of the catalyst container, a thermostatic switch on the cylinder head energizing the solenoid valve as long as the engine temperature is below 15°C, thus shunting the post-combustion air to atmosphere during starting when the motor is cold and the mixture rich.

The subject arrangement of the present embodiment thus allows the supply of post-combustion air to the exhaust and cuts off that supply by simple and completely automatic means either when the motor is cold and requires a richer combustion mixture or, with minimum delay in response, when the temperature in the catalyst container risks the onset of reactions harmful to the latter.

Furthermore, the fact that the action of the vacuum on the diaphragm of the shunting valve is no longer tied to changes in motor speed eliminates the buffer capacitance of the basic embodiment, as well as the removal of it from the circuit by means of the solenoid valve. This permits the vacuum chamber to be placed where the capacitance was, in order to avoid the sealing problem presented by the sleeve of the control rod connecting the diaphragm to the shunting valve and valve cups. This arrangement simplifies the shunting valve and its circuit for connection to vacuum.

Referring now to FIG. 2, the valve comprises a body 1' closed at one end by a perforated cap 2' containing a muffler 3' and at the other by a diaphragm 5' enclosed from above by a cap 6' forming a vacuum chamber 7'.

The air supplied by a pump 9' driven by the motor 10' arrives by way of passage 11', passes through the body 1' and the orifice of valve 12' and follows the outlet passage 13' to the air injectors 14 in the mounting brackets of the exhaust manifold 15' of the motor.

The diaphragm 5' moves the control rod 16' to which valve 12' is rigidly attached and a cup 17' on the end supporting a spring 18' which presses a cup 19', sliding on the lower section of rod 16', either against the seat 20' of the relief valve for the air, or against a shoulder 21' on the rod 16' when the latter, pushed down by the combined action of the diaphragm 5' and spring 31', opens the orifice 22' of the relief valve.

The vacuum chamber 7' of the shunting valve is connected to the intake manifold 23' of the motor by a series of passageways 33, 34, and 35, and by a vacuum tank 36 and solenoid valve 25' in that order going from intake to valve.

The vacuum tank 36 has in its outlet towards the intake manifold 23' a check valve 37 mounted and adjusted so as to block path 33 when the vacuum in intake manifold 23' is less than 300 mbar.

The valve 27' of the solenoid valve 25' closes, under the action of either the switch 28' of the thermostat on the cylinder head when the engine temperature to below 15°C or the temperature sensor 38 in the catalyst container when the latter reaches and exceeds 700°C, each energizing by its closure the coil 29', the path between the vacuum tank 36 and the vacuum chamber 7', simultaneously connecting the latter to atmosphere by opening orifice 30'.

In operation, during cold starting, the closure of the switch 28' of the thermostat on the cylinder head sets the vacuum chamber 7' to atmospheric pressure which allows spring 31' to push down diaphragm 5' causing the closure of valve 12' and opening orifice 22' to discharge the post-combustion air through muffler 3'.

As soon as the vacuum in intake manifold 23' reaches and exceeds 300 mbar the ball 39 of the check valve 37 compresses spring 40 thus establishing the vacuum in vacuum tank 36.

When the engine temperature reaches and exceeds 15°C the opening of the thermostatic switch 28' on the cylinder head de-energizes the coil 29' and the valve 27' driven by its spring 32' closes the orifice 30' and simultaneously connects the vacuum chamber 7' to the vacuum tank 36. The diaphragm 5' is drawn back, opening valve 12' and closing orifice 22'. Cup 19' closing this orifice compresses spring 18'. The compression of springs 18' and 31' brake the retraction of diaphragm 5', thus assuring some gradualness in the opening of valve 12'.

The shunting valve is then in its normal operating position, transmitting the supply of postcombustion air from pump 9' to air injectors 14' in the mounting brackets of the exhaust manifold 15'.

At high speed, when air pump 9' supplies too much air, throttling by valve 12' limits the flow and the resultant high pressure in passage 11' pushes cup 19' back on its spring 18', discharging the surplus air to atmosphere through orifice 22' and muffler 3'.

When the vacuum in intake manifold 23' becomes less than 300 mbar, for example when the engine is under full load, spring 40 of the check valve 37 seats ball 39 and closes passage 33 between intake manifold 23' and vacuum tank 36 and this allows vacuum chamber 7' to be subjected to vacuum at any motor speed.

When the temperature in the catalyst container goes above 700°C the closure of sensor switch 38 instantaneously, in the same way as during cold starting, sets vacuum chamber 7' to atmospheric pressure. Immediately diaphragm 5' is pushed down, closing valve 12' and opening orifice 22' to discharge the post-combustion air through muffler 3'.

When the temperature in the catalyst container falls below 700°C the opening of the sensor switch 38 de-energizes coil 29' and valve 27' driven by its spring 32', closes the orifice 30' to atmosphere and simultaneously reconnects vacuum chamber 7' to vacuum tank 36. Diaphragm 5' is again drawn back to reopen valve 12', close orifice 22' and redirect the supply of post-combustion air to the injectors 14 in the mounting brackets of the exhaust manifold 15' of the motor.

The subject valve of the present invention thus covers all operating conditions of the motor with increased safety and with a simpler circuit for post-combustion air supply than the valve of the first embodiment.

Solenoid valve 25' permits the shunting of post-combustion air to atmosphere with a minimum of means and power consumption both during cold starting and when the temperature in the catalyst container becomes excessive.

Since there is no longer a need for chamber 4' to be airtight it has an opening 41' to atmosphere. The sleeve 42 of rod 16' is advantageously mounted in a cup 43 inserted in the body 1' which allows, before its incorporation, the use of a larger access hole in the body 1' for lapping the seat 44 of valve 12'.

Obviously, numerous modifications and variations of the present invention are possible in light of the above teachings. It is therefore to be understood that within the scope of the appended claims, the invention may be practiced otherwise than as specifically described therein.

What is claimed as new and desired to be secured by Letters Patent of the United States is:

1. A multifunction control valve for regulating the supply of post-combustion air to the exhaust manifold of an internal combustion engine comprising:

an inlet connected to an air pump;

an outlet supplying air to said exhaust manifold and a diverter outlet to atmosphere through a muffler;

a chamber having a diaphragm disposed therewithin so as to divide said chamber into a delay capacitance and a vacuum chamber, said delay capacitance being connected to intake manifold vacuum and to atmosphere while said vacuum chamber is always connected to said intake manifold vacuum, said diaphragm being capable of being deflected by said intake manifold vacuum for controlling the closure of one or the other of said outlets by means of a valve; and a solenoid valve interposed between and interconnecting said delay capacitance and said vacuum chamber for selectively and alternatively subjecting said delay capacitance to said intake manifold vacuum or to atmosphere, said solenoid valve being electrically connnected to a starter switch control circuit of said engine and adapted to be closed during starting so as to connect said capacitance to atmosphere.

2. A multifunction control valve as set forth in claim 1, wherein said diverter outlet is closed by a cup held against a seat by compression of a spring, said spring sensitively balancing the force of a second spring pressing against said diaphragm separating said delay capacitance and said vacuum chamber, said cup being capable of sliding on a valve rod, of said diaphragm.

3. A multifunction control valve as set forth in claim 1, wherein said solenoid valve is located between said delay capacitance and a constriction.

* * * * *